United States Patent [19]

Nylund

[11] Patent Number: 5,089,220
[45] Date of Patent: Feb. 18, 1992

[54] FUEL ASSEMBLY FOR A BOILING REACTOR

[75] Inventor: Olov Nylund, Västerås, Sweden
[73] Assignee: ABB Atom AB, Västerås, Sweden
[21] Appl. No.: 606,454
[22] Filed: Oct. 31, 1990

[30] Foreign Application Priority Data

Nov. 14, 1989 [SE] Sweden .............................. 8903817

[51] Int. Cl.⁵ .............................................. G21C 3/34
[52] U.S. Cl. .................................. 376/439; 376/443; 376/438
[58] Field of Search ............... 376/443, 438, 439, 442, 376/426; 55/440

[56] References Cited

U.S. PATENT DOCUMENTS

| | | | |
|---|---|---|---|
| 3,395,077 | 7/1968 | Tong et al. | 376/439 |
| 4,692,302 | 9/1987 | Demario et al. | 376/439 |
| 4,738,698 | 4/1988 | Holcblat | 55/440 |
| 4,758,403 | 7/1988 | Noailly | 376/439 |
| 4,765,949 | 8/1988 | Denizou et al. | 376/443 |
| 4,775,509 | 10/1988 | Noailly et al. | 376/442 |
| 4,804,516 | 2/1989 | Thomazet et al. | 376/439 |
| 4,827,063 | 5/1989 | Bökers et al. | 376/439 |
| 4,933,138 | 6/1990 | Movesca et al. | 376/442 |
| 4,975,101 | 12/1990 | Swanborn | 55/440 |

Primary Examiner—Brooks H. Hunt
Assistant Examiner—Meena Chelliah
Attorney, Agent, or Firm—Watson, Cole, Grindle & Watson

[57] ABSTRACT

The invention relates to a fuel assembly in the form of an elongated channel having several corners. The channel is connected to a coolant intended to flow through the channel. A bundle of similarly elongated fuel rods, retained by a plurality of spacers (8), is arranged in the channel. The spacer (8) has an outer frame which is provided all around with a plurality of windows (10). According to the invention, deflection fins (9) are placed in said window and are so directed that cooling water flowing along the wall of the fuel assembly is diverted in a direction towards the center of the channel to improve the cooling for those fuel rods which are located in this region.

4 Claims, 2 Drawing Sheets

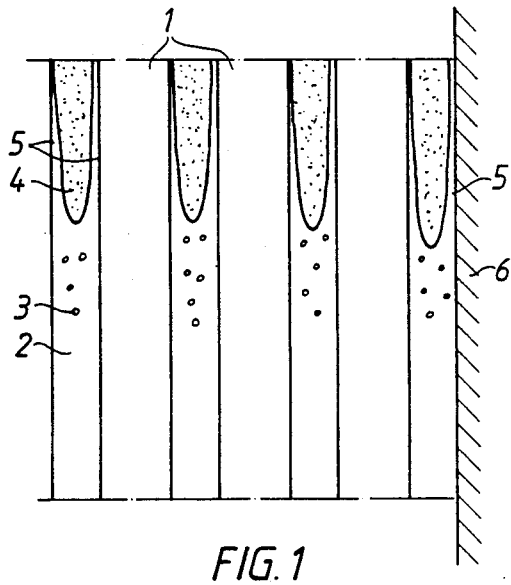
FIG. 1
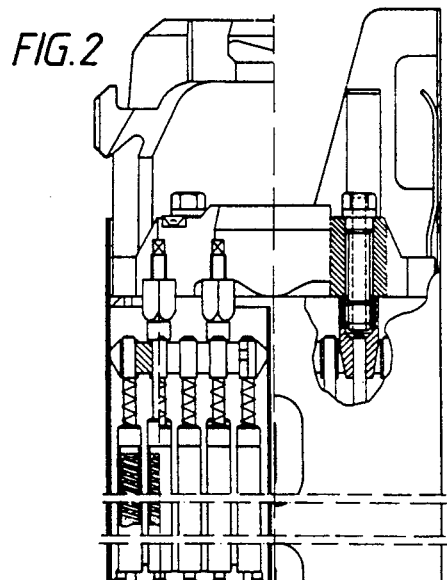
FIG. 2
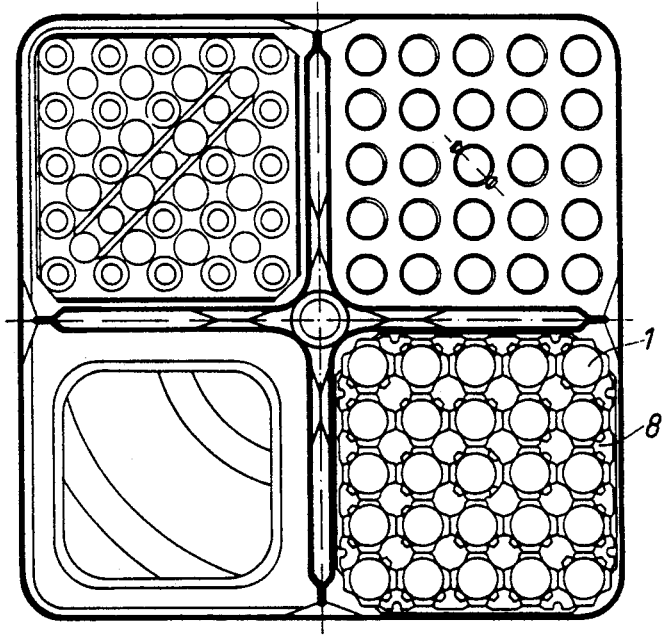
FIG. 3
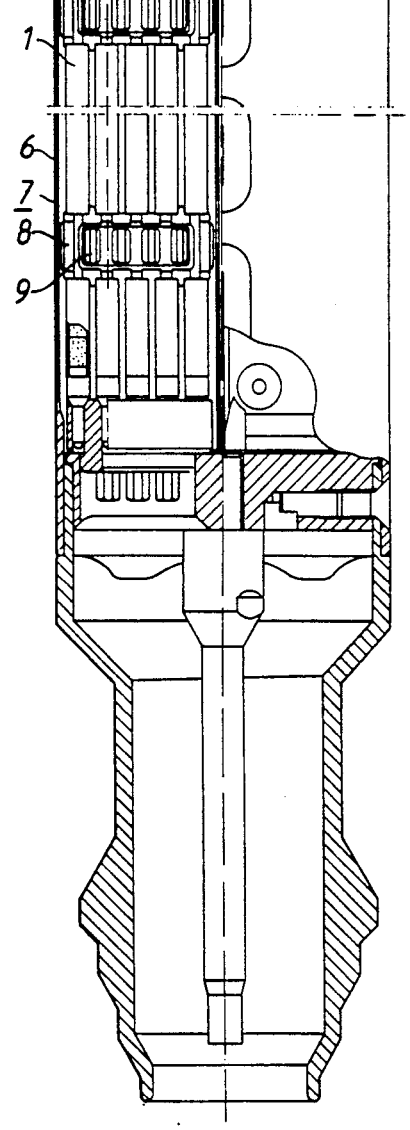

FUEL ASSEMBLY FOR A BOILING REACTOR

BACKGROUND OF THE INVENTION

The present invention relates to a fuel assembly for a boiling reactor. The fuel assembly comprises a bundle of elongated fuel rods retained by a number of so-called spacers placed with a certain distance between each other along the bundle. A coolant, for example water, is adapted to flow from below and upwards through the fuel assembly which normally is arranged vertically and, upon a nuclear reaction, to cool the fuel rods arranged in the fuel assembly. The object of the invention is to increase the efficiency of this cooling of the fuel rods.

In a boiling type nuclear reactor the steam formation in the fuel assembly increases more and more towards the upper part of the assembly, as is clear from FIG. 1 which shows, in rough outline, a cross section of part of a fuel assembly. In FIG. 1, 1 designates a fuel rod and 2 spaces between the rods. This space 2 is in the lower part of the fuel assembly (corresponding to the lower part of the core of the reactor), filled with coolant, in this case water. Further up in the fuel assembly, steam bubbles 3 are formed in the water which, still further up, is transformed into water steam in the region 4. As long as so-called dry out does not take place, however, there is always a film 5 of the cooling water on the fuel rods. It is important that this film 5 is maintained at all points of the rods 1. If at some point it disappears by dry out, serious damage at this point of the fuel rod 1 will rapidly arise.

In FIG. 1, 6 designates the wall of the fuel assembly. Also this is normally coated with a water film 5. However, this film 5 is not entirely necessary since the wall 6 of the assembly is considerably more insensitive to superheating compared with the fuel rods. This fact has been observed and attempts have been made to make use of it in some known designs, as, for example, in U.S. Pat. No. 4,749,543, column 8 and FIG. 9. In these designs, the cooling water flowing along the wall 6 of the fuel assembly is diverted towards the centre of the bundle by means of elevations on the wall 6 or recesses in the same. Also fins on the downstream side of the spacers are used to achieve a diversion or deflection of the cooling water. All these embodiments have certain drawbacks. Thus, for example, the elevations may increase the pressure drop in the cooling water and thus reduce the cooling effect, whereas recesses in the wall entail certain difficulties from the point of view of manufacturing technique. Further, a deflection of the cooling water flowing along the assembly wall 6 should take place as early as possible in relation to each separate spacer and, in any case, preferably not immediately after the same viewed in the direction of flow. This is due to the fact that dry outs normally occur immediately upstream of a spacer or possibly in the same.

SUMMARY OF THE INVENTION

The present invention relates to a device, in a spacer (13) known, inter alia, from Swedish patent 8601982-5 (see FIG. 1 of that patent), for achieving the desired deflection in a simple manner. According to the invention, the spacer is equipped with deflection fins arranged in the windows of the spacer.

BRIEF DESCRIPTION OF THE DRAWINGS

FIG. 1 described the wall of the fuel assembly. The invention will be best understood with reference to the accompanying FIGS. 2-7.

FIG. 2 shows a fuel assembly for four separate bundles of fuel rods and FIG. 3 shows a cross section through the same assembly.

FIG. 7 showing a view along line 7—7 in FIG. 6.

In FIG. 2, 7 designates the fuel assembly in the form of an elongated multi-corner channel with a wall 6. The fuel assembly 7 accomodates spacers 8 with windows 10 of a known type. FIG. 3 shows one of the same spacers 8 seen from above with fuel rods 1.

FIG. 4 schematically shows a spacer 8 provided with deflection fins 9 in the windows 10 which extend in the downstream direction of coolant flow and include portions which extend inwardly towards a center line of the channel and terminate at a tip (free end) 9a. To be able easily to insert a bundle of fuel rods with spacers into the fuel assembly 7, each spacer 8 is provided with guide studs 11 which, however, are too small to have any guiding effect on the coolant flowing past.

Figure 4:
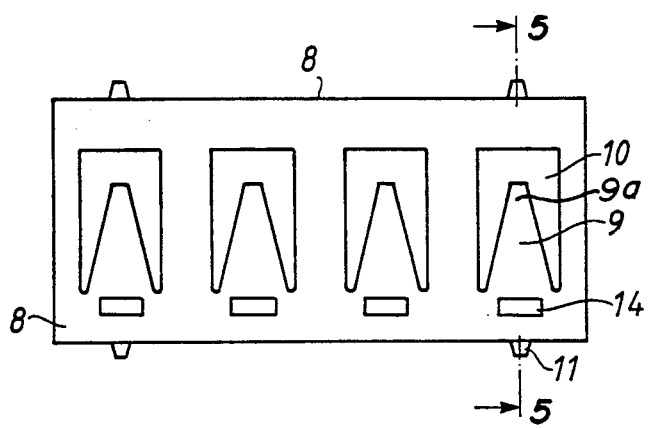
FIG. 4 schematically shows one of the spacers, shown in FIG. 2, seen from the side but provided with fins according to the invention.
Figure 5:
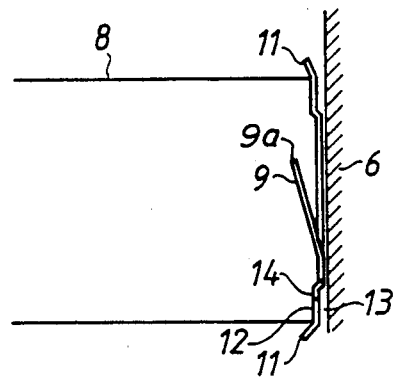
FIG. 5 is a section along line 5—5 in FIG. 4.

The frame of the spacer 8 consists of a metal band of, for example, Inconel which is placed on edge. The lower edge of the band, i.e., its upstream outer portion 12, has been arranged, around the spacer 8, drawn in towards the centre of the spacer 8. When the bundle of fuel rods with the spacer 8 is located in the fuel assembly 7, this leads to the creation of a pocket 13 between the assembly wall 6 and the drawn-in outer portion 12 of the spacer 8. So that the film of cooling water flowing along the assembly wall 6 shall not be stopped in this pocket 13, openings 14 have been provided through the frame of the spacer 8 below each deflection fin 9.

Figure 6:
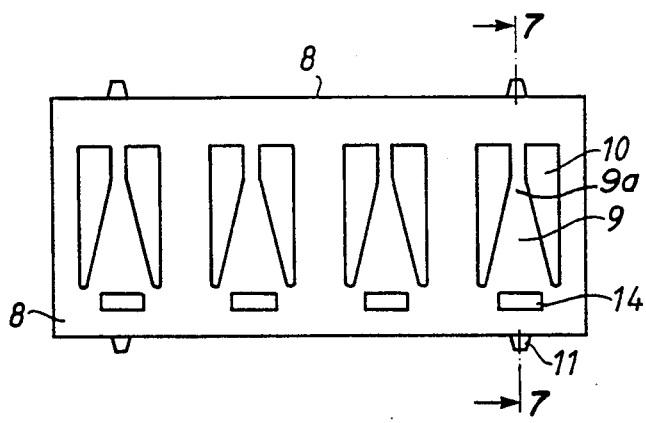
FIGS. 6 and 7 show an additional embodiment of the finned spacer.
Figure 7:
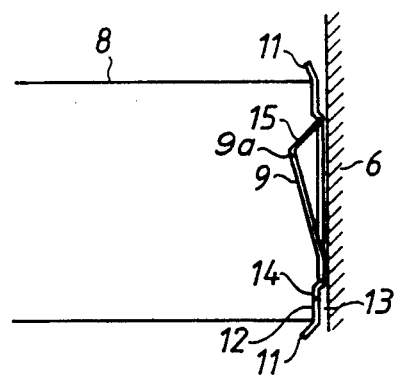

FIGS. 6 and 7 show substantially the same spacer 8, with the difference that the tip (free-end) 9a of the deflection fin 9 is connected by means of a supporting band 15 to a downstream edge of the window 10 in order to obtain a somewhat more stable design.

The invention functions in such a way that the elongated deflection fins 9 conduct cooling water from the region at the fuel assembly wall 6 in towards the centre of the fuel rod bundle, thus improving the cooling thereof. That part of the cooling water which is led into the pocket 13 flows through the openings 14 and contacts the deflection fins 9 which, as mentioned above, conduct the cooling water towards the centre of the spacer.

I claim:

1. A fuel assembly in the form of an elongated multi-corner channel having a wall, said channel being connected to a coolant intended to traverse the channel in a downstream direction, a bundle of similarly elongated fuel rods arranged in the channel and retained by a plurality of spacers placed along the bundle, each one of said spacers comprising a number of cells surrounded by an outer frame in the form of a band placed on edge, said band arranged to fit closely in the channel, said band being provided with a number of windows, wherein in at least certain of said windows a deflection fin is arranged fixed to an upstream edge of each respective window, each said fin extending in the direction of flow from said edge and including a portion which extends in a direction towards a centre of the channel in order to divert coolant flowing along an inner wall of the channel in a direction towards the centre of the channel.

2. A fuel assembly according to claim 1, wherein an upstream outer portion of the band up to a middle portion on the band around the band extends towards the center of the spacer in relation to said middle portion to form a pocket between said outer portion and the inner wall of the channel, and wherein openings are provided in the band on the upstream side of each respective window to provide fluid communication between the pocket and an interior of the spacer.

3. A fuel assembly according to claim 1, wherein a downstream end of each fin is joined by means of a supporting band to a downstream edge of each corresponding window.

4. A fuel assembly which comprises a wall that defines an elongated, multi-cornered channel through which coolant can flow from an upstream end to a downstream end, a bundle of elongated fuel rods positioned in said channel, and a plurality of spacer means positioned at separated locations along said bundle of fuel rods, each of said spacer means comprising an elongated outer band located adjacent said wall, means defining a plurality of cells within the outer band and a center line, said elongated outer band including a plurality of window through which coolant passing in said channel adjacent said wall can flow, said window having upstream edges, and fins connected to said upstream edges of at least some of said window, said fins including portions which extend inwardly of said wall and in said downstream direction so as to deflect coolant flowing in said downstream direction inwardly of said wall and towards said center line.

* * * * *